3,310,532
METHOD FOR PREPARATION OF MODIFIED POLYESTERS HAVING FIBER- AND FILM-FORMING PROPERTIES
Seiji Kazama and Takeo Shima, Yamaguchi-ken, Japan, assignors to Teikoku Jinzo Kenshi Kabushiki Kaisha, Osaka, Japan, a corporation of Japan
No Drawing. Filed May 8, 1962, Ser. No. 193,308
Claims priority, application Japan, May 10, 1961, 36/15,807
2 Claims. (Cl. 260—75)

This invention relates to a method for preparation of modified polyesters having fiber- and film-forming property. More particularly, the invention relates to a method for preparation of modified polyesters containing in their main chains ether glycol which is a condensation product of acyclic glycol or cyclic glycol.

The preparation of polyethylene terephthalate by two steps is known. That is, in the first step terephthalic acid or its lower aliphatic ester is reacted with ethylene glycol to yield bis-($\beta$-hydroxyethyl)-terephthalate or its oligomers, and then in the second step the reaction product of the first step is further heated.

The fibers or films obtained from the polyethylene terephthalate possess, inter alia, high degrees of crystallinity, and high softening points as well as excellent properties as regards their chemical stability, heat stability, photostability, tenacity and Young's modulus.

On the other hand, polyethylene terephthalate possess disadvantages such as poor dyeability, inferior processing properties and the fact that fibers obtained therefrom pill easily. Hence, notwithstanding their many excellent properties, limitations are imposed on their use.

The object of the invention is to provide modified polyesters possessing tenacity and elongation such as to fit them for normal clothing and industrial uses, and also a high affinity for dispersed dyes.

Another object of the invention is to provide modified polyesters possessing excellent processing properties such as formability.

Still another object of the invention is to provide modified polyesters formable into fibers of high resistance to pilling.

Another object of the invention is to provide a method for preparing the modified polyesters having the above-described properties with uniformity by simple operations.

Further objects and advantages of the invention will become apparent from the following descriptions.

Above objects and advantages of the invention can be accomplished by, in the process of producing polyethylene terephthalate by the two steps of first reacting terephthalic acid or its lower aliphatic ester with ethylene glycol to form bis-($\beta$-hydroxyethyl)-terephthalate or its oligomers and second heating the reaction product obtained in the first step, i.e., bis-($\beta$-hydroxyethyl)-terephthalate or its oligomers, adding at least one compound selected from the group consisting of sulfonic acid compounds having no ester-forming functional group, acidic derivatives thereof and acid-forming derivatives thereof except esters (hereinafter shall be referred to as "additives" for convenience's sake) to the reaction system after the first step reaction and while the intrinsic viscosity [$\eta$] of the reaction product is less than 0.3 as measured in ortho-chlorophenol at 35° C., in an amount sufficient to render the softening point of the product polymer within the range of 210°–250° C.

The invention shall be described more in detail hereinbelow.

THE ADDITIVES

The additive used in the invention is, as aforesaid, selected from the group consisting of alkali hydrogen sulfates, acid reactive sulfates, sulfonic acid compounds having no ester-forming functional group, acidic derivatives thereof and acid-forming derivatives thereof except esters.

The sulfonic acids having no ester-forming functional group include, for example, aromatic sulfonic acids such as stearyloxybenzen sulfonic acid, lauryl benzene sulfonic acid, naphthalene sulfonic acids; and aliphatic sulfonic acids such as propane-2-sulfonic acid and cyclohexane sulfonic acid.

The acid derivatives of sulfonic acid compounds having no ester-forming functional groups include, for example, alkaline earth metal salts of said sulfonic acids such as of magnesium, calcium, etc., or of their salts of zinc, cadmium, manganese, lead, etc.

Again, "acid-forming derivatives of the foregoing compounds" refers to such a substance which is not itself acidic, but can form an acid upon thermal decomposition, alcoholysis or hydrolysis after being added to the reaction system.

Further, aforesaid additives useful to the invention must be all such that is at least partially soluble in ethylene glycol used for the preparation of object polyesters.

PERIOD OF ADDITION

According to the invention, the above additives are added, after the reaction in the first step of polyester-forming reaction, and while the intrinsic viscosity [$\eta$] of the reaction product of the second step remains less than 0.3 as measured in ortho-chlorophenol at 35° C., to the reaction system in the second step. Hereinafter, "intrinsic viscosity [$\eta$]" refers to the value measured in ortho-chlorophenol at 35° C.

If the additives are added during the first-step reaction, generally the reaction mixture is discolored, and in case lower aliphatic ester of terephthalic acid is used as the starting material, the rate of ester-interchange reaction of the first step is remarkably lowered while the condensation reaction of ethylene glycol progresses at an excessive rate to lower the softening point of the product polyester undesirably.

Similarly, if the addition of the additives to the reaction system is effected after the intrinsic viscosity [$\eta$] of the reaction product became higher than 0.3, the ethylene glycol removing reaction from the bis-($\beta$-hydroxyethyl)-terephthalate or its lower polycondensate obtained by the first step reaction advances excessively to cause a very low concentration of alcoholic hydroxyl group in the reaction system. As the result, even addition of a great amount of additives will fail to form the object ether-bond to the desired degree.

Accordingly, in the present invention the additives must be added to the reaction system in the second reaction step, after the first reaction step and during the period when the intrinsic viscosity of the reaction product of the second step is less than 0.3.

While the amount of additives to be added shall be described hereinafter, it is desirable that the less added, the earlier it is preferred to add the additives within the specified period, and vice versa.

AMOUNT TO BE ADDED

The aforesaid additives useful for the invention are added during the second step of aforesaid polyethylene terephthalate-forming reaction, in an amount sufficient to render the softening point of the product modified polyester within the range of 210°–250° C.

The softening point of the polyethylene terephthalate obtained by the second step reaction between terephthalic acid or its lower aliphatic ester with ethylene glycol varies somewhat depending on the type and amount of the catalyst used in the first and second steps, but generally it is within the range of about 255°–263° C. And, under the conditions heretofore most commonly employed, polyethylene terephthalate having a melting point at about 262° C. is obtained.

The addition of the additives to the reaction system during the specified second step of polyethylene terephthalate-forming reaction always causes a lowering of the softening point of the product polymer. This is because the addition of the additives to the alcoholic hydroxyl group-containing compounds present in the reaction system of, for example, bis-($\beta$-hydroxyethyl)-terephthalate or its oligomers or ethylene glycol, etc., etherifying reaction takes place by de-hydration condensation, resulting in the formation of modified polyethylene terephthalate, having molecules containing poly-(oxyethylene)-glycol component, mainly diethylene glycol, of a molecular weight of 200 or less, incorporated with its main chain.

Accordingly, the amount of additive to be used should be predetermined according to each type of additive so as to render the softening point of the polymer obtained by the second step reaction within the range of 210°–250° C. The amount of the poly-(oxyethylene)-glycol of a molecular weight of 200 or less formed differs depending on the type and period of addition of the additives used in the invention.

For illustration purpose, the upper and lower limits of the amount of additive to be added is shown in Table I below.

It should be noted, however, that if metal compounds of high basicity such as alkali metals or alkaline earth metals are used as the catalyst in the first step reaction, the additives should be added in an amount in addition to that shown in Table I to neutralize such compounds containing metals of high basicity.

TABLE I

| Additive | Lower Limit (mol percent) | Upper Limit (mol percent) |
| --- | --- | --- |
| Acid alkali sulfate | 0.01 | 0.1 |
| Acid-reactive sulfate | 0.1 | 1.0 |
| Sulphonic acid | 0.005 | 0.1 |

The upper and lower limits of the amount of additives as shown in the above Table I are expressed in terms of mol percent of the acid component used in the invention (terephthalic acid or its lower aliphatic ester).

The amount of additive should not be too small to drop the softening point of the product polymer to 250° C. or less because in such a case the etherifying by dehydration condensation induced among the alcoholic hydroxyl group-containing compounds present in the reaction system comprising, for example, bis-($\beta$-hydroxyethyl)-terephthalate, its oligomers, and unreacted ethylene glycol, etc. does not progress to the desired degree, and consequently the satisfactory improvements in dyeability of the product polyester and the resistance to pilling of the fibers obtained therefrom cannot be achieved.

An attempt to prevent coloration of polyesters by means of adding phosphoric acid or phosphorous acid, etc. to the reaction system during the second step of the reaction for forming polyesters has been known. For such purpose, phosphoric acid or phosphorous acid was added in an amount at most 0.23 mol percent, preferably 0.01–0.1 mol percent based on the dibasic acid used. However, addition of that much phosphoric acid or phosphorous acid to the reaction system after the completion of the first step reaction cannot induce a satisfactory degree of etherifying reaction of alcoholic hydroxyl group-containing compounds.

Again if the amount of the additive is to great so as to cause the lowering in the softening point of the product polymer below 210° C., excessive degree of etherifying reaction takes place, resulting in over-introduction of ether glycol component into the main chain of product polyethylene terephthalate which is the cause of the conspicuous drop in the softening point of the modified polyethylene terephthalate. And, while other physical properties are also impaired, the improvements in dyeability and resistance to pilling are not so conspicuous.

From the foregoing reasons, the amount and period of adding the additives are necessarily so adjusted within the above-specified range that the product modified polyethylene terephthalate comes to have a softening point between 210°–250° C. By so doing, modified polyethylene terephthalate containing in its main chain 2–25 mol percent, preferably 5–15 mol percent, based on the total acid component, of poly-(oxyethylene)-glycol component of a molecular weight of 200 or less which is mainly diethylene glycol formed by the addition of said additive or additives is obtained. Thus obtained modified polyethylene terephthalate possesses sufficient film- and fiber-forming property as well as improved dyeability and processing properties, and the fibers obtained by shaping the same have an improved resistance to pilling.

Further, in preparing polyethylene terephthalate, it is possible to prepare poly-(oxyalkylene)-glycol modified polyethylene terephthalate by adding poly-(oxyalkylene)-glycol to the reaction system together with terephthalic acid or its lower aliphatic ester and ethylene glycol. However in that case a part of the poly-(oxyalkylene)-glycol added to the reaction system is distilled out under the reaction conditions, and it is very difficult to introduce the poly-(oxyalkylene)-glycol component into the main chain of polyethylene terephthalate at a desired ratio.

The following references illustrate attempts for obtaining co-condensate by adding diethylene glycol to ethylene glycol in advance, in the purpose of making similarly modified polyethylene terephthalate as of Examples 1–4 which shall be described later.

REFERENCE

The practice of Example 1, to be described later, was repeated, except that diethylene glycol in the amount indicated in Table 2 was added and 0.076 part by weight of calcium acetate monohydrate was used in place of zinc acetate during the ester-interhange reaction. A polyester was obtained. Percentage in Table 2 means mol percent based on the acid component.

TABLE 2

| Diethylene glycol (part) | Calculated softening point (° C.) | Softening point (° C.) |
| --- | --- | --- |
| 0 | 263 | 263.3 |
| 2.23 (4.2%) | 251 | 258.1 |
| 3.71 (7.0%) | 242 | 254.1 |

Generally, when a third component is copolymerized with polyethylene terephthalate, it is observed that per each mol percent of the third component, the softening point of the product polymer is lowered by about 3° C. The calculated softening points inferred from the same theory are also shown in Table 2.

That the actually measured softening points proved to be substantially higher than the theoretical values indicates that not all of the diethylene glycol added became the construction unit of the polyester, but the greatest part thereof was removed outside the reaction system by evaporation during the polycondensation under a reduced pressure. Therefore in preparing poly-(oxyalkylene)-glycol-modified polyester, it should be understood that with addition of poly-(oxyalkylene)-glycol component to the reaction system with dibasic acid and dihydric alcohol, it is very difficult to introduce into the main chain of polyester poly-(oxyalkylene)-glycol component at a desired ratio.

In contrast to this, according to the present invention, there is such an advantage that by adding a predetermined amount of the specified additive at the specified period to the reaction system in the second step of polyethylene terephthalate production, polyethylene terephthalate of uniform quality modified by a constant ratio of poly-(oxyethylene)-glycol can always be obtained.

As has been already stated, this invention relates to a method for preparation of polyethylene terephthalate modified by poly-(oxyethylene)-glycols of molecular weight of 200 or less consisting mainly of diethylene glycol, using as the starting materials terephthalic acid or its lower aliphatic ester and ethylene glycol, whereas it is also possible in the invention to substitute less than 15 mol percent of said terephthalic acid or its lower aliphatic esters by other difunctional acids or their lower aliphatic esters and/or less than 15 mol percent of said ethylene glycol by other dihydric alcohols.

Such difunctional acids or their lower aliphatic esters other than terephthalic acid or its lower aliphatic esters include: aliphatic dicarboxylic acids such as succinic, adipic, and sebacic acid; aromatic dicarboxylic acids such as isophthalic, diphenyldicarboxylic, naphthalene dicarboxylic, diphenyletherdicarboxylic, diphenylsulfone dicarboxylic, diphenylmethanedicarboxylic, and diphenoxyethanedicarboxylic acid; aromatic hydroxycarboxylic acids such as p-hydroxybenzoic, vanillic, p-($\beta$-hydroxyethoxy)-benzoic, and p-($\beta$-hydroxyethoxy)-vanillic acid, or their derivatives; and the lower aliphatic esters of these difunctional acids.

Also as dihydric alcohols substitutable with a part of ethylene glycol, aliphatic glycols of 3 to 10 carbon atoms, and cyclic glycols such as cyclohexanediol, 1,4-dihydroxymethyl-cyclohexane and 2,2-bis-[p-($\beta$-hydroxyethoxyl)-phenyl]-propane may be named.

In that case, the modification with the dibasic acids other than terephthalic acid or their derivatives and/or dihydric alcohols other than ethylene glycol as well as the modification with the introduction of poly-(oxyethylene glycol) of a molecular weight less than 200 into the main chain in accordance with the invention are effected to accomplish the preparation of modified polyesters of improved dyeability and processing property.

The modified polyesters obtained by the invention are highly crystalline, and have excellent physical and chemical properties. According to the invention it is possible to improve surprisingly the dyeability and processing properties of such polyesters, and also the resistance to pilling and filling properties of the fibers obtained therefrom. Therefore, the polyesters obtained by the invention are particularly suitable to be shaped into fibers, films, etc.

Further it is also in the scope of this invention, in the purpose of raising the melt viscosity of the product polyesters to facilitate the shaping operation of the polyesters as well as to change the tenacity and elongation characteristics of the polyester fibers or films, to add a branching agent such as a compound having in its molecule at least three ester-forming functional groups, e.g. benezene-1,3,5-tricarboxylic acid, trimetallic acid, pyromellitic acid, pentaerythritol, or their functional derivatives in the amount of 0.05–5 mol percent (to the acid component) to the reaction system before the polycondensation of the product polyester is completed.

A phosphorous compound such as phosphoric acid, phosphorous acid, their salts and esters may be added as the coloration preventing agent in an amount of 0.2 mol percent or less (to the acid component). Again in practicing the present method, other auxiliaries such as ester interchange catalyst, esterifying catalyst, polycondensation catalyst, molecular weight controlling agent, delusterant or for coloring purpose, dyes and pigments, may be added according to the accepted practices.

The examples of the invention shall be given hereinbelow, it being understood that these are given only for the purpose of illustration, and the scope of the invention shall be in no sense limited thereby.

In the following examples, parts and percent denote those by weight and mole percent to the total acid component, respectively, unless otherwise indicated. The degree of coloration of the polyesters was shown by Hunter's L and b values measured by color-difference meter. Again the dyeability was expressed by an arbitrary unit as of the dye adsorption amount obtained when the polyester was dyed in a dye bath of constant dye concentration at a constant bath ratio. The softening point of polyester was measured by penetrometer.

Examples 1–5

A three-neck flask connected with distillation column was charged with 97.0 parts of dimethyl terephthalate, 68.0 parts of ethylene glycol, 0.0218 part of zinc acetate dihydrate, and 0.0388 part of antimony trioxide, and the temperature thereof was gradually raised. After the methanol formed by the ester interchange reaction has thoroughly distilled off, bisulfate was added thereto each in the amount indicated in Table 3. Then the flask was transferred to a salt bath of 275° C., and while being stirred by the rate of 60 r.p.m., subjected to stepwisely reduced pressures, i.e. normal pressure for 30 minutes, 20 mm. Hg for 30 minutes, and 0.2 mm. Hg for 90 minutes; and ethylene glycol thus released was taken out of the reaction system.

The properties of the polyester thus obtained were as follows:

TABLE 3

| Ex. No. | Additive | Amount (percent) | Softening point (° C.) | Dyeability | Degree of Coloration | | $[\eta]$ |
|---|---|---|---|---|---|---|---|
| | | | | | L | b | |
| 1 | KHSO₄ | 0.085 | 230.3 | ++++ | 83.1 | −0.8 | 0.61 |
| 2 | KHSO₄ | 0.065 | 240.3 | +++ | 81.9 | 1.5 | 0.68 |
| 3 | KHSO₄ | 0.043 | 251.3 | ++ | 83.1 | −1.9 | 0.70 |
| 4 | KHSO₄ | 0.022 | 256.3 | + | 90.7 | 0.8 | 0.58 |
| 5 | NaHSO₄H₂O | 0.085 | 242.5 | +++ | 83.2 | 0.8 | 0.62 |

The polyester yarn obtained in Example 1 was hydrolyzed by immersion in normal alcoholic potassium hydroxide to separate dipotassium terephthalate from glycol component. An analysis of the glycol component by gas chromatography revealed the presence of 12 ±0.8 mol percent of diethylene glycol to the acid component, but no higher (polyoxyethylene) glycol was detected.

With the increase in the amount of potassium hydrogen sulfate added the product polymer came to have lower softening point and improved dyeability. Indicates the fact that the acidic additive accelerates the dehydration condensation among glycol molecules condensation among glycol molecules, and the thus formed polyglycol bonds as the construction unit of the ester. The above fact also indicates that the crystallinity of the product polymer can be optionally controlled by regulating the amount of the additive.

Examples 6–8

The operations of Example 1 were repeated except that in place of potassium hydrogen sulfate, zinc sulfate, manganous sulfate and potassium pyrosulfate were respectively used. The properties of the obtained polyesters were as in the following Table 4.

TABLE 4

| Ex. No. | Additive | Amount (percent) | Softening point (°C.) | Dyeability | Degree of Coloration | | $[\eta]$ |
|---|---|---|---|---|---|---|---|
| | | | | | L | b | |
| 6 | ZnSO$_4$ | 0.40 | 230.5 | ++++ | 79.1 | 5.3 | 0.62 |
| 7 | MnSO$_4$ | 0.40 | 233.1 | ++++ | 77.2 | 3.2 | 0.60 |
| 8 | K$_2$S$_2$O$_7$ | 0.033 | 240.5 | +++ | 82.7 | 2.0 | 0.64 |

Thus, not only the bisulfates used in the Examples 1–5, neutral metal salts of lower basicity also shown similar effectiveness.

*Example 9*

The operations of Example 1 were repeated except the in place of 68.0 parts of ethylene glycol, 62.0 parts of ethylene glycol and 7.8 parts of 2,2-bis[p-(β-hydroxyethoxy)-phenyl] propane were used. The modified polyester obtained had excellent whiteness, an intrinsic viscosity $[\eta]$ of 0.64, a softening point of 235.6° C. and very good dyeability.

*Example 10*

A reaction vessel connected with a distillation column was charged with 970 parts of dimethyl terephthalate, 2.1 parts of pentaerythritol, 690 parts of ethylene glycol, and 0.88 part of calcium acetate, then subjected to heating with stirring.

After the methanol formed had distilled off, the reaction mixture was transferred to an autoclave, and added with 0.024% of potassium hydrogen sulfate, 0.3 part of antimony trioxide, 0.5 part of phosphorous acid, and 5 parts of titanium oxide. The whole mixture was then heated to 275° C.

As the reaction proceeded, the pressure was gradually reduced, and finally the reaction was carried out for 100 minutes at 0.2 mm. Hg. The polymer obtained had an intrinsic viscosity $[\eta]$ of 0.54, a softening point of 242.3° C., a melt viscosity of 2500 poises (275° C.) and was a spinnable, white polymer.

Separately, for purpose of control the above operations were repeated except that no pentaerythritol was added. The obtained polymer had an intrinsic viscosity of 0.56, a softening point of 244.2° C., and a melt viscosity of 830 poises. When the same was melt-spun, due to the low melt viscosity, the spinning operation was difficult.

What we claim is:

1. Method for preparation of modified polyesters by a two-step process comprising a first step wherein terephthalic acid and its lower aliphatic esters are reacted with ethylene glycol to form bis-(β-hydroxyethyl)-terephthalate and its oligomers, and a second step wherein the reaction product of the first step is heated to form polyethylene terephthalate, the improvement characterized in that, after the first reaction step and while the intrinsic viscosity ($\eta$) of the reaction product is less than 0.3 as measured in ortho-chlorophenol at 35° C., an additive selected from the group consisting of alkali hydrogen sulfates, sulfonic acids, having no ester-forming functional groups in their molecules other than sulfonic groups and acid-reactive sulfates is added to the reaction system whereby the softening point of the polymer is obtained within the range of 210 to 250° C., said alkali hydrogen sulfates and said sulfonic acids being added in an amount of 0.01 to 0.1 mol percent, and said acid-reactive sulfates being added in an amount of 0.1 to 1.0 mol percent based on said acid component.

2. Method for preparation of modified polyesters in accordance with claim 1 wherein a compound having at least three ester-forming functional groups in its molecule is added to the reaction system as a branching agent in an amount of 0.05–5 mol percent based on the acid component, before completion of the reaction.

References Cited by the Examiner

UNITED STATES PATENTS

| 2,938,015 | 5/1960 | Gormley | 260—75 |
| 3,020,263 | 2/1962 | Foster | 260—75 |
| 3,028,366 | 4/1962 | Engle et al. | 260—75 |
| 3,053,809 | 9/1962 | Linville | 260—75 |
| 3,167,531 | 1/1965 | Parker et al. | 260—75 |

FOREIGN PATENTS

| 625,312 | 8/1961 | Canada. |
| 634,224 | 1/1962 | Canada. |
| 793,589 | 4/1958 | Great Britain. |
| 802,921 | 10/1958 | Great Britain. |

LEON J. BERCOVITZ, *Primary Examiner.*

JAMES A. SEIDLECK, *Examiner.*

R. W. GRIFFIN, *Assistant Examiner.*